(12) United States Patent
Venkatesh et al.

(10) Patent No.: US 6,748,086 B1
(45) Date of Patent: Jun. 8, 2004

(54) CABIN COMMUNICATION SYSTEM WITHOUT ACOUSTIC ECHO CANCELLATION

(75) Inventors: Saligrama R. Venkatesh, Jersey City, NJ (US); Alan M. Finn, Hebron, CT (US)

(73) Assignee: Lear Corporation, Southfield, MI (US)

( * ) Notice: Subject to any disclaimer, the term of this patent is extended or adjusted under 35 U.S.C. 154(b) by 547 days.

(21) Appl. No.: 09/691,869

(22) Filed: Oct. 19, 2000

(51) Int. Cl.$^7$ .............................................. A61E 11/06
(52) U.S. Cl. .......................... 381/71.4; 381/86; 381/92
(58) Field of Search ........................ 381/92, 356, 91, 381/86, 71.4, 94.1, 94.2

(56) References Cited

U.S. PATENT DOCUMENTS

| | | | |
|---|---|---|---|
| 5,361,305 A | 11/1994 | Easley et al. | 381/58 |
| 5,473,701 A | * 12/1995 | Cezanne et al. | 381/92 |
| 5,802,184 A | 9/1998 | Heath | 381/71.4 |
| 5,872,852 A | 2/1999 | Dougherty | 381/57 |
| 6,040,761 A | 3/2000 | Grassmann | 340/425.5 |

OTHER PUBLICATIONS

Finn et al. ; Cabin communication System; Dec. 10, 1998; WO 98/56208.*
McDinald et al. ; Noise suppression in Vehicles; Aug. 23, 1990; WO 90/09655.*

* cited by examiner

*Primary Examiner*—Melur Ramakrishnaiah
(74) *Attorney, Agent, or Firm*—Bill C. Panagos

(57) ABSTRACT

A cabin communication system for improving clarity of a voice spoken within an interior cabin uses a microphone array including a first microphone, positioned at a first location within the cabin, for receiving the spoken voice primarily in a first direction and for converting the spoken voice into a first audio signal, and a second microphone, positioned at a second location within the cabin, for receiving the spoken voice primarily in the first direction and for converting the spoken voice into a second audio signal. A sound source, such as the speaker of an entertainment system, inputs sound into the cabin such that the input sound approaches the microphone array primarily in a second direction different from the first direction. A processor combines the first and second audio signals to provide a resultant audio signal, wherein the combining of the first and second audio signals defines a beampattern of the microphone array that includes a plurality of lobes and a plurality of nulls such that the spoken voice is primarily received by the microphone array along the first direction at a first one of the plurality of lobes and such that the input sound is primarily received by the microphone array along the second direction at a first one of the plurality of nulls, whereby any component in the resultant audio signals indicative of the input sound is substantially minimal. The cabin communication system further includes a loudspeaker for converting the resultant audio signal into an output reproduced voice within the cabin, and advantageously the beampattern is such that the output reproduced voice is also received at a null of the beampattern.

14 Claims, 6 Drawing Sheets

CABIN COMMUNICATION SYSTEM WITHOUT ACOUSTIC ECHO CANCELLATION

FIELD OF THE INVENTION

The present invention relates to a cabin communication system without acoustic echo cancellation that nevertheless provides echo rejection to enable a voice spoken within the cabin to be increased in volume for improved understanding without creating any unwanted noise amplification. The present invention also relates to a movable cabin that advantageously includes such a cabin communication system for this purpose. In this regard, the term "movable cabin" is intended to be embodied by a car, truck or any other wheeled vehicle, an airplane or helicopter, a boat, a railroad car, turboprop aircraft and indeed any other enclosed space that is movable and wherein a spoken voice may need to be amplified or clarified.

BACKGROUND OF THE INVENTION

As anyone who has ridden in a mini-van, sedan or sport utility vehicle will know, communication among the passengers in the cabin of such a vehicle is difficult. For example, in such a vehicle, it is frequently difficult for words spoken by, for example, a passenger in a back seat to be heard and understood by the driver, or vice versa, due to the large amount of ambient noise caused by the motor, the wind, other vehicles, stationary structures passed by etc., some of which noise is caused by the movement of the cabin and some of which occurs even when the cabin is stationary, and due to the cabin acoustics which may undesirably amplify or damp out different sounds. Even in relatively quiet vehicles, communication between passengers is a problem due to the distance between passengers and the intentional use of sound-absorbing materials to quiet the cabin interior. This communication problem is frequently compounded by the simultaneous use of high-fidelity stereo systems for entertainment, whether those systems are traditional audio systems or, as is coming into prevalence now, television and/or computer systems that provide an audio output.

To amplify the spoken voice, it may be picked up by a microphone and played back by a loudspeaker. However, if the spoken voice is simply picked up and played back, there will be a positive feedback loop that results from the output of the loudspeaker being picked up again by the microphone and added to the spoken voice to be once again output at the loudspeaker.

To avoid an echo due to the reproduced voice itself, prior art approaches have generally used acoustic echo cancellation, such as for example in U.S. Pat. No. 5,602,928, which includes active noise control (ANC), or in U.S. Pat. No. 5,706,344, which does not include ANC. In this type of system, an acoustic echo cancellation apparatus can be coupled between the microphone and the loudspeaker to remove the portion of the picked-up signal corresponding to the voice component output by the loudspeaker. This is possible because the audio signal at the microphone corresponding to the original spoken voice is theoretically highly correlated to the audio signal at the microphone corresponding to the reproduced voice component in the output of the loudspeaker.

Any reproduced noise components may not be so highly correlated and need to be removed by other means, for example by means of an appropriate noise filter.

These systems attempt to selectively receive speech from one location (e.g. by a microphone from where a first person in the vehicle is talking), enhance that speech by removing noise and entertainment stereo interference, amplify the enhanced speech and reproduce it in another location (i.e. from a loudspeaker directed at a second person in the vehicle). It is highly desirable not to degrade either the quality of the speech or the quality of the entertainment stereo output.

In an enclosed cabin with such prior art systems, the microphone and the loudspeaker are not acoustically isolated, i.e. the microphone is in a position to pick up the output of the loudspeaker. As noted above, the acoustic echo cancellation system is intended to estimate and remove from the microphone signal that part which is due to speech, music, noise etc. that was just played out of the loudspeakers. It is particularly important that the music (or other sounds) from the high-fidelity stereo system be cancelled. Any uncancelled music will be reproduced in the cabin from a loudspeaker at a location spaced from the original stereo system loudspeaker. This results in the detriment of stereo separation, fade and balance. It may introduce unpleasant reverberation due to processing delays, where the delay in picking up the music by the microphone, processing it and then re-outputting it by the loudspeakers may be long enough to be detectible by the human ear. Therefore, the connection of the high fidelity stereo system to the acoustic echo cancellation system contributes to the cabin communication system cost.

FIG. 1 is a simplified block diagram of a conventional cabin communication system (CCS) 100 using a microphone 102 and a loudspeaker 104. As shown in the figure, a conventional echo canceller 106 and a conventional speech enhancement filter (SEF)108 are connected between the microphone 102 and loudspeaker 104. A summer 110 subtracts the output of the echo canceller 106 from the input of the microphone 102, and the result is input to the SEF 108 and used as a control signal therefor. The output of the SEF 108, which is the output of the loudspeaker 104, is the input to the echo canceller 106. In the echo canceller 106, on-line identification of the transfer function of the acoustic path (including the loudspeaker 104 and the microphone 102) is performed, and the signal contribution from the acoustic path is subtracted at summer 110.

As disclosed in a commonly-assigned U.S. patent application, a further development of such a system, illustrated in FIG. 2, includes a novel and unobvious echo canceller 112 and a novel and unobvious speech extraction filter in the form of a special Wiener filter 114, and further includes a specific input from the car's (vehicle's) audio system. This input is fed to a stereo gain estimator 116, such as a conventional single tap LMS, which estimates a cancellation signal to be fed to the echo canceller 112 through summer 118 under the control of the output of summer 110.

However, there are certain problems associated with the use of an acoustic echo cancellation (AEC) system in a cabin communication system. First, the AEC must be adaptive to accommodate changes in the acoustic environment, and second it provides cancellation proportional to the length of its filters. An AEC will always have some residual, i.e. partially uncancelled, signal that may be perceptually unpleasant or contribute to unintelligibility. Long AEC filter length and adaptivity impose a significant computational cost.

The requirement of adaptation on the AEC also poses a problem in system stability. The AEC must adapt to changes in the environment, e.g. passenger movement, such that it always provides enough cancellation. Insufficient cancellation results in a loop gain greater than one and unpleasant acoustic screeching.

A further problem with known cabin communication systems (CCS) is the need for microphone independence. The microphones of known CCS's are often responsive to not only the desired location, but also to other locations as well. This has the undesirable effect that a person hears an amplified version of his own speech. Ideally, each person should hear only the amplified versions of the other passengers' speech.

One approach to solve this problem is found in the above-mentioned U.S. patent application using acoustic echo cancellation, wherein a plurality of microphones are used at each location and each plurality is beamformed to improve the signal to noise ratio of the person speaking, to reject some of the stereo signal from the stereo system loudspeakers and to provide some microphone independence. There are many well known beamforming techniques and adaptive microphone arrays, although some do not relate to spatial filtering and no conventional system is known to be applied to the particular requirements of a CCS.

OBJECTS AND SUMMARY OF THE INVENTION

Accordingly, it is an object of the invention to provide a cabin communication system that avoids the problems of the prior art.

It is another object of the invention to provide a cabin communication system that provides echo cancellation without using an acoustic echo cancellation system.

It is yet another object of the invention to provide an adaptive nulling microphone array that is advantageously used in a cabin communication system of a moving vehicle.

It is a further object of the invention to provide a moving vehicle including a cabin communication system incorporating an advantageous adaptive nulling microphone array in the moving vehicle.

It is yet a further object of the present invention to provide a cabin communication system which effectively rejectes sounds from, and therefor does not interfere with, audio entertainment systems.

In accordance with these and other objects of the invention, a cabin communication system for improving clarity of a voice spoken within an interior cabin includes a microphone array, the microphone array including a first microphone, positioned at a first location within the cabin, for receiving the spoken voice primarily in a first direction and for converting the spoken voice into a first audio signal, and a second microphone, positioned at a second location within the cabin, for receiving the spoken voice primarily in the first direction and for converting the spoken voice into a second audio signal. A sound source is provided that inputs sound into the cabin such that the input sound approaches the microphone array primarily in a second direction different from the first direction, and a processor combines the first and second audio signals to provide a resultant audio signal. The combining of the first and second audio signals defines a beampattern of the microphone array that includes a plurality of lobes and a plurality of nulls such that the spoken voice is primarily received by the microphone array along the first direction at a first one of the plurality of lobes and such that the input sound is primarily received by the microphone array along the se direction at a first one of the plurality of nulls, whereby any component in the resultant audio signal indicative of the input sound is substantially minimal. A loudspeaker then converts the resultant audio signal into an output reproduced voice within the cabin.

Advantageously, the first and second microphones define a beamformed phase array and the first one of the plurality of lobes is a main lobe of the beampattern. The sound source can be the loudspeaker, and the cabin communication system may further comprise a second sound source, such as the speaker of an entertainment system, that Inputs a second sound directionally into the cabin such that the input second sound approaches the microphone array primarily in a third direction different from both the first and second directions, wherein the input second sound is primarily received by the microphone array along the third direction at a second one of the plurality of nulls, whereby any component in the resultant audio signal indicative of the input second sound is substantially minimal.

In accordance with another aspect of the invention, there is provided a movable cabin including means for moving the cabin and a cabin communication system as indicated above.

These and other objects, features and advantages of the present invention will become apparent from the following detailed description of the preferred embodiment taken in connection with the attached drawings.

DETAILED DESCRIPTION OF THE PREFERRED EMBODIMENT

Figure 3:
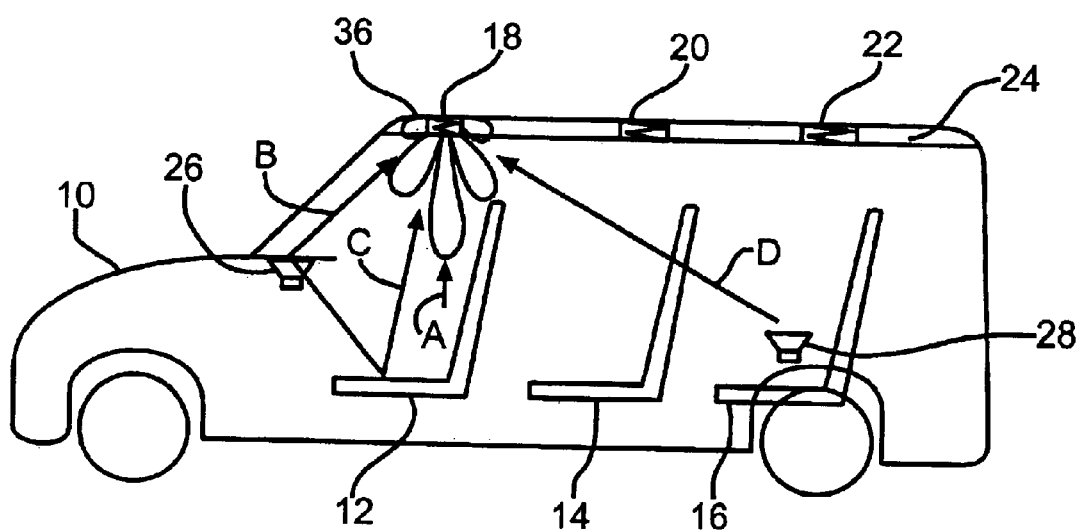
FIG. 3 is an illustrative drawing of a vehicle incorporating a preferred embodiment of the present invention.

Before addressing the specific implementation of the microphone array beamforming and adaptive nulling system in accordance with the present invention, it is helpful to understand the context wherein it operates. FIG. 3 illustrates a preferred embodiment of the present invention as implemented in a mini-van 10. As shown in FIG. 3, the mini-van 10 includes a driver's seat 12 and first and second passenger seats 14, 16. Associated with each of the seats is a respective microphone array 18, 20, 22 adapted to pick up the spoken voice of a passenger sitting in the respective seat. In creating the present invention, it has been found that it is advantageous in enhancing the clarity of the spoken voice to use a microphone array to pick up the spoken voice from the location where it originates, e.g. the passenger or driver seat. This can be achieved by beamforming the microphones into a beamformed phase array, or more generally, by providing plural microphones whose signals are processed in combination to indicate the location of the spoken voice. The plural microphones in each array 18, 20, 22 can be directional microphones or omnidirectional microphones, whose combined signals define the detecting location. The system uses the plural signals in processing to compensate for differences in the responses of the microphones. Such differences may arise, for example, from the different travel paths to the different microphones or from different response characteristics of the microphones themselves. As a result, omnidirectional microphones, which are substantially less expensive than directional microphones, can be used. When providing the cabin communication system in possibly millions of cars, such a practical consideration as cost can be a significant factor. The use of such a system of plural microphones is therefore advantageous in a movable vehicle cabin, wherein a large, delicate and/or costly system may be undesirable.

Referring again to FIG. 3, the microphone arrays 18–22 are advantageously located in the headliner 24 of the mini-van 10. Also located within the cabin of the mini-van 10 are plural loudspeakers 26, 28. While three microphone arrays and two loudspeakers are shown in FIG. 3, it will be recognized that the number of microphone arrays and loudspeakers and their respective locations may be changed to suit any particular cabin layout.

Figure 4:
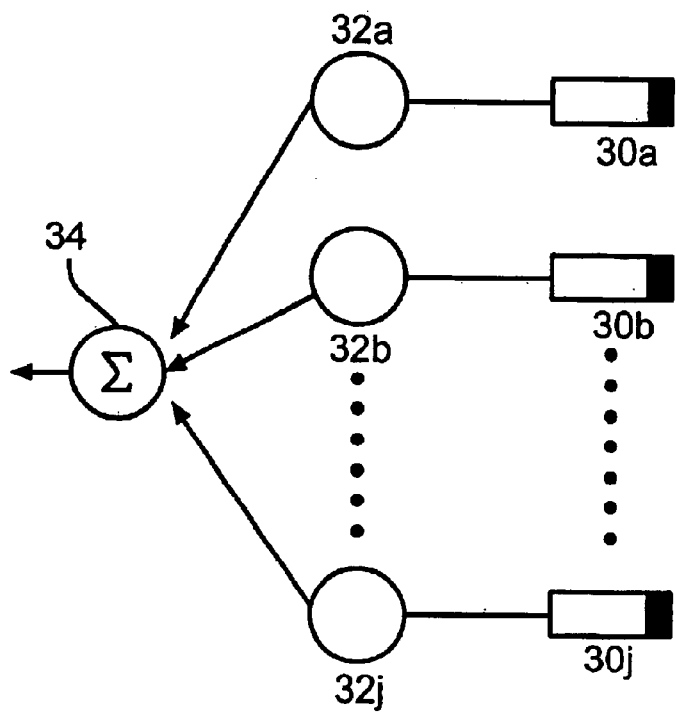
FIG. 4 is an illustrative drawing of a microphone array for use in the preferred embodiment of the present invention.

FIG. 4 illustrates an exemplary structure of the microphone array 18. As shown therein, the microphone array 18 includes a plurality of microphones $30_a$–$30_j$, where the number of microphones is any number equal to or greater than two. The larger the number of microphones, the more specific the lobe pattern of the microphone array can be, and this feature is exploited in the present invention. Conversely, the larger the number of microphones, the greater the required processing and the greater the equipment cost. It has been found that the most advantageous number of microphones for use with the CCS of the present invention varies with each vehicle and its geometry.

In the array 18, the signals from each microphone $30_a$–$30_j$ are passed through respective filters $32_a$–$32_j$ to compensate for delays, changes in volume and other acoustic effects among the microphones, and then added in a summing amplifier 34 to form a resultant sum signal. The structure of the other arrays 20 and 22 is the same as that of array 18.

Because the microphones are formed into arrays 18, 20, 22, each array will have a respective beam pattern indicative of the direction or directions in which the array is most sensitive to sound (lobes) and the direction or directions in which the array is least sensitive to sound (nulls).

Figure 5:
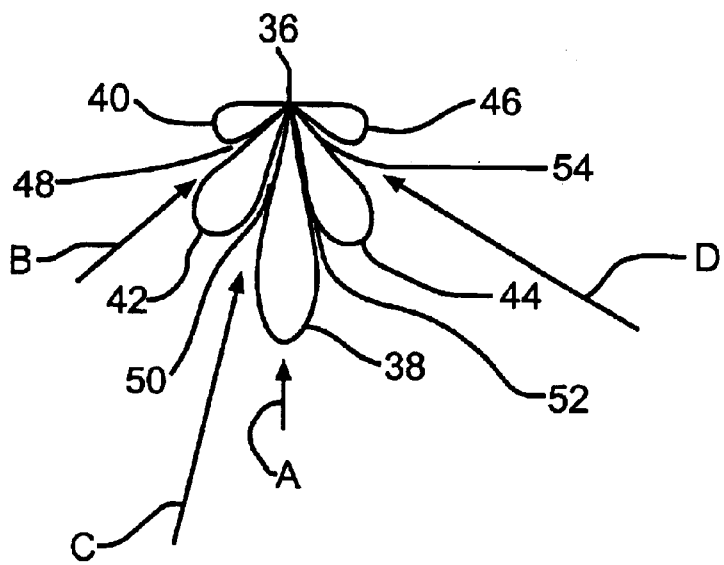
FIG. 5 is an expanded view of a beampattern shown in FIG. 3.

As shown in FIG. 3, the array 18 has a beampattern 36 associated therewith. FIG. 5 is an enlarged view of the beampattern 36, showing that it includes a main lobe 38 and four side lobes 40, 42, 44 and 46. Between each pair of lobes is a null, specifically nulls 48, 50, 52 and 54. As is well known in the art, sound received at the array 18 from the direction indicated by arrow A to the center of the main lobe 38 is most strongly picked up, as compared to sound received at any other portion of the beampattern. Sound received at any other of the lobes is also picked up, but less strongly. Finally, sound received at any of the nulls 48–54 is effectively not picked up at all, or at least is picked up substantially more weakly than sound received from other directions, depending on the depth of the null. Thus, sound received at the array 18 from the directions indicated by arrows B, C and D to nulls 48, 50 and 54 is effectively not picked up, and therefore any component in the audio signal generated in the array 18 in response to such sound is minimal.

Referring again to FIG. 3, it will be seen that arrow A (in FIG. 5) identifies the direction from which the spoken voice of the person occupying the seat 12 is received at array 18. This direction points to the center of the main lobe of the beampattern 36. Accordingly, this spoken voice is picked up most strongly for processing and output by, for example, loudspeaker 28 to amplify and emphasize the spoken voice for the benefit of the occupant of the seat 16.

It will further be seen that arrow D (in FIG. 5) identifies the direction from which the output of the loudspeaker 28 is received at the array 18. This direction points to the null 54 of the beampattern 36. Accordingly, this output is rejected from array 18, i.e. it is picked up weakly if at all, and therefore any component in the audio signal at the output of the summer 34 of the array 18 from the output of the loudspeaker 28 is minimal.

Loudspeaker 26 represents a speaker of an entertainment system, such as an audio system or a television or computer system. As indicated in FIG. 3, there may be multiple paths from a speaker to the array 18. FIG. 3 illustrates two such paths, a direct path indicated by arrow B and a reflected path, indicated by arrow C. As discussed in connection with FIG. 5, both arrows B and C indicate directions pointing to nulls of the beampattern 36, specifically nulls 48 and 50. Therefore, like the sound from loudspeaker 28 received at null 54, sound from the loudspeaker 26 is picked up weakly if at all, and therefore any component in the audio signal picked up by the output of the summer 34 of the array 18 from the output of the loudspeaker 26 is minimal.

It is well known to those of ordinary skill in the art how to combine the signals from the microphones $30_a$–$30_j$ in order to direct the lobes and nulls of the beampattern 36 in the desired directions. Therefore, once the geometry of the cabin has been determined including the placement of the microphone arrays, the loudspeakers and the seats, it is a matter of engineering design to combine the signals to achieve the desired orientations of lobes and nulls.

Figure 6:
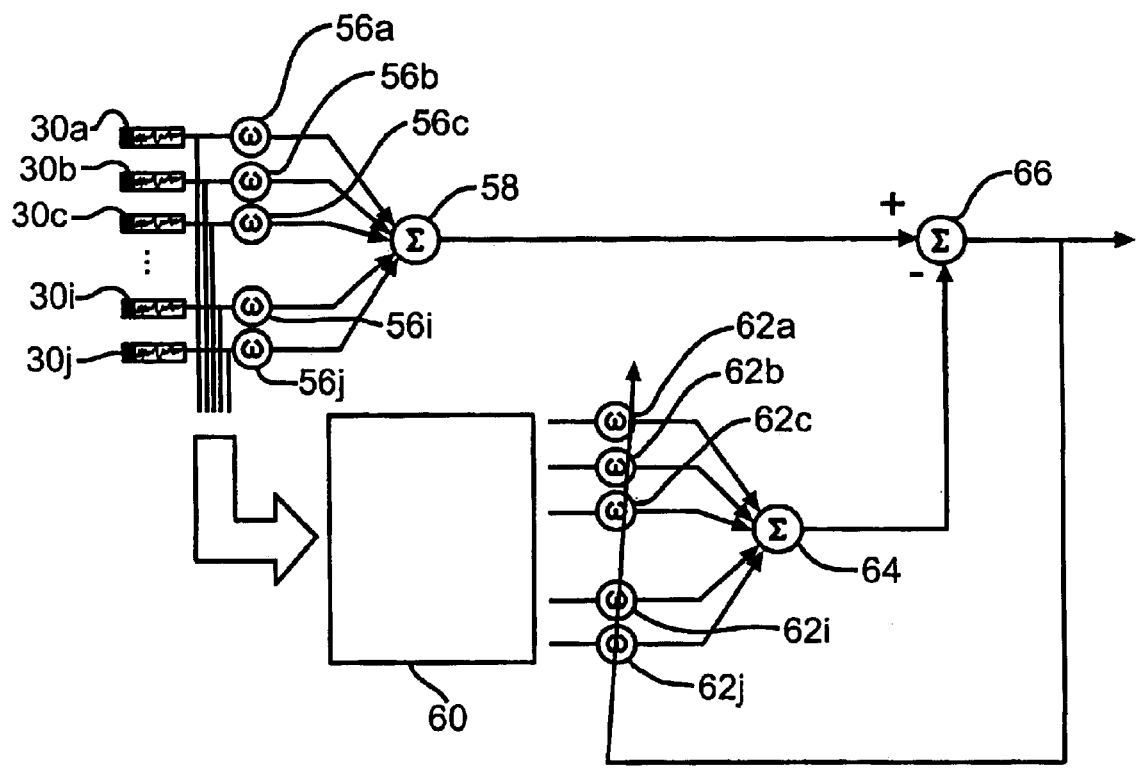
FIG. 6 is a block diagram of a microphone array beamforming and adaptive nulling system for the preferred embodiment of the present invention.

One example of a circuit to achieve this result is shown in FIG. 6. As shown therein, inputs from the microphones $30_a$–$30_j$ are combined using upper weights ω in subprocessors $56_a$–$56_j$ and then added in summer 58 to make the array 18 sensitive in a desired direction, e.g. to point the main lobe 38 at the occupant of seat 12. This process can be simplified by physically pointing the array 18 in the direction of arrow A. These inputs are also fed through blocking matrix 60 and are combined using adaptive weights ω in subprocessors $62_a$–$62_j$ and then added in summer 64 to make the array 18 insensitive in desired directions, e.g. to point nulls in the directions of arrows B, C and D. The outputs of summers 58 and 64 are then subtracted in summer 66 to generate a resultant signal dependent on the desired beampattern. This resultant signal is then output for processing, e.g. noise cancellation, and is ultimately output as the reproduce spoken voice from loudspeaker 28. The resultant signal is also fed back to subprocessors $62_a$–$62_j$ to modify the adaptive weights ω in accordance with known techniques to direct the positions of the nulls. The adaptive beamforming may be used to identify directions of high noise and to point a null at those directions.

Although not illustrated, it will be understood that arrays 20 and 22 have their own respective beampatterns to accept the sound from desired locations, e.g. their respective seats, and to reject sound from other directions, e.g. directions known to correspond to direct or reflected paths of input noise not intended to be amplified by the respective array. Each such array will also have associated therewith any appropriate loudspeakers.

Figure 1:
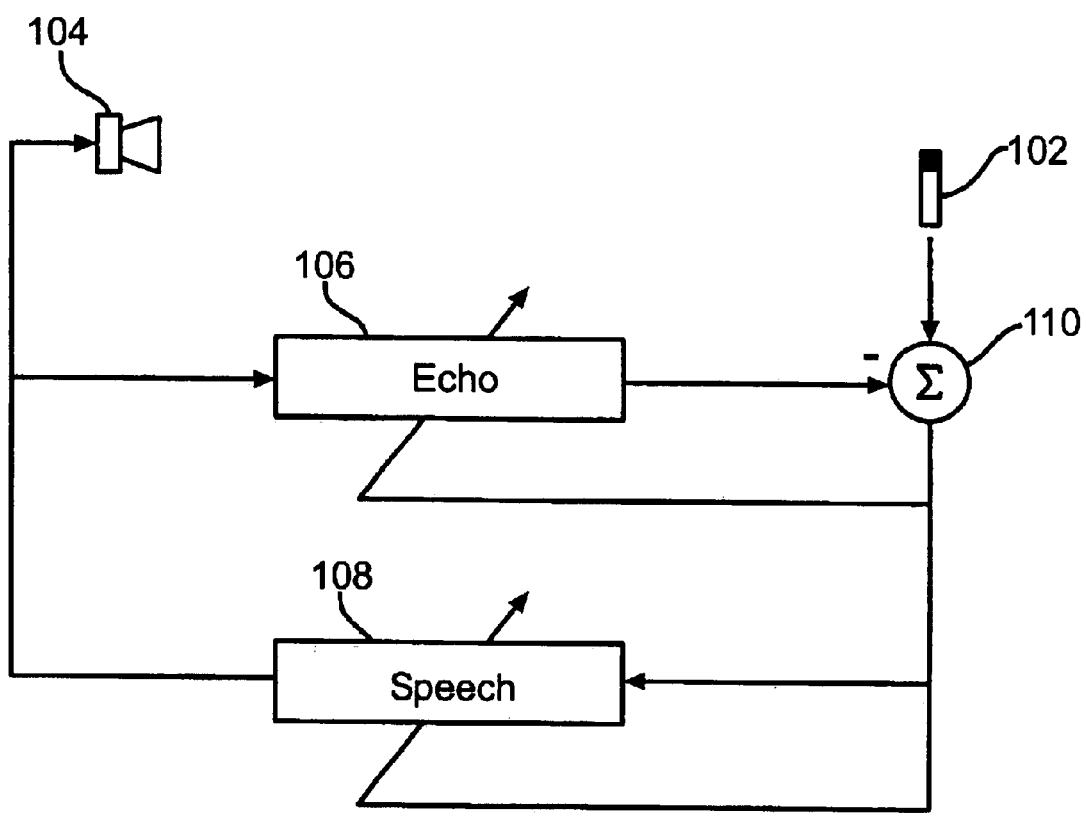
FIG. 1 is a simplified block diagram of a conventional cabin communication system using acoustic echo cancellation.
Figure 2:
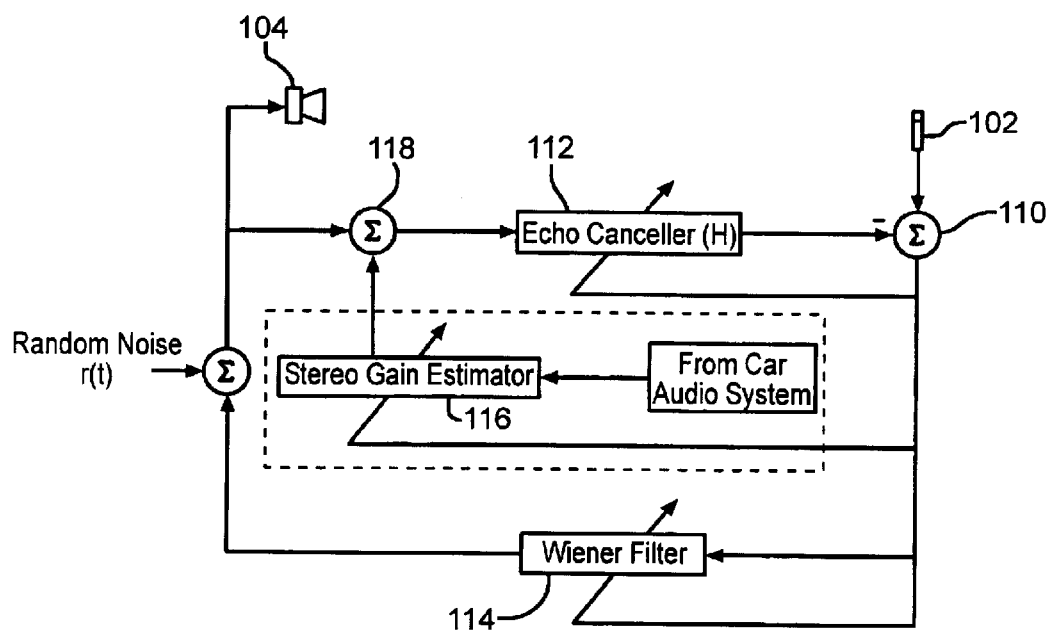
FIG. 2 is a block diagram of an unconventional cabin communication system using acoustic echo cancellation with direct stereo input.
Figure 7:
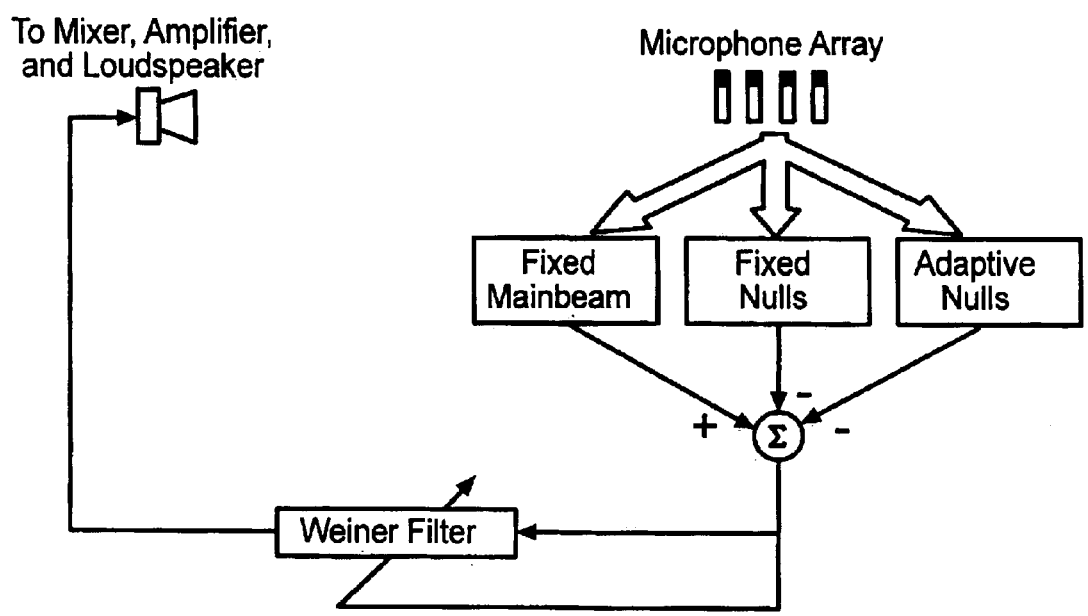
FIG. 7 is a diagram of a cabin communication system including the microphone array beamforming and adaptive nulling system of FIG. 6.

FIG. 7 illustrates a cabin communication system including the adaptive microphone array of FIG. 6, and is to be compared with the cabin communication systems illustrated in FIGS. 1 and 2. As a result of the above-described operation of the present invention, the phased array microphones are highly receptive to signals from certain fixed spatial locations, e.g. from individual passenger seating locations. The phased array microphones are simultaneously capable of rejecting signals from other fixed spatial locations, e.g. the loudspeaker locations. The phased array microphones are further capable of adaptively selecting spatial locations with high noise and rejecting signals from those directions.

Accordingly, the phased array microphones enable the system to selectively receive speech from one location and to reject noise, entertainment stereo sound and speech from other locations. The received speech can then be optionally enhanced, amplified and reproduced in another location within the cabin. This operation does not degrade the quality of either the speech or the entertainment stereo sound. Moreover, the system naturally provides for microphone independence.

As shown in FIG. 7, the speech signal may be enhanced with a Wiener filter or advantageously a low-order time-domain causal linear filter, or spectral subtraction or other in-line noise reduction approaches may be employed.

Thus, in accordance with the present invention, it is unnecessary to provide an acoustic echo cancellation system to cancel echos, in particular the signal from a car stereo system or the signal from the loudspeaker of a cabin communication system. Instead, the microphone array beamforming and adaptive nulling system provides good rejection of these signals without the high cost and complexity of previous systems.

Although the invention has been shown and described with respect to an exemplary embodiment thereof, it should be understood by those skilled in the art that the description is exemplary rather than limiting in nature, and that many changes, additions and omissions are possible without departing from the scope and spirit of the present invention, which should be determined from the following claims.

We claim:

1. A cabin communication system for improving clarity of a voice spoken within an interior cabin, said cabin communication system comprising:

a microphone array, said microphone array including a first microphone, positioned at a first location within the cabin, for receiving the spoken voice primarily in a first direction and for converting the spoken voice into a first audio signal, and a second microphone, positioned at a second location within the cabin, for receiving the spoken voice primarily in the first direction and for converting the spoken voice into a second audio signal;

a sound source that inputs sound into the cabin such that the input sound approaches said microphone array primarily in a second direction different from the first direction;

a processor for combining said first and second audio signals to provide a resultant audio signal, wherein the combining of said first and second audio signals defines a beampattern of said microphone array that includes a plurality of lobes and a plurality of nulls such that the spoken voice is primarily received by said microphone array along the first direction at a first one of said plurality of lobes and such that the input sound is primarily received by said microphone array along the second direction at a first one of said plurality of nulls, whereby any component in said resultant audio signal indicative of the input sound is substantially minimal; and a loudspeaker for converting said resultant audio signal into an output reproduced voice within the cabin.

2. The cabin communication system of claim 1, wherein said first and second microphones define a beamformed phase array.

3. The cabin communication system of claim 2, wherein the first one of said plurality of lobes is a main lobe of said beampattern.

4. The cabin communication system of claim 2, wherein said sound source is said loudspeaker.

5. The cabin communication system of claim 4, further comprising a second sound source that inputs a second sound into the cabin such that the input second sound approaches said microphone array primarily in a third direction different from both the first and second directions, wherein the input second sound is primarily received by said microphone array along the third direction at a second one of said plurality of nulls, whereby any component in said resultant signal indicative of the input second sound is substantially minimal.

6. The cabin communication system of claim 5, wherein said second sound source is a loudspeaker of an entertainment system.

7. The cabin communication system of claim 2, wherein said sound source is a loudspeaker of an entertainment system.

8. A movable vehicle cabin comprising:

means for causing movement of said cabin; and a communication system for improving clarity of a voice spoken within an interior of said cabin, wherein said cabin communication system comprises:

a microphone array, said microphone array including a first microphone, positioned at a first location within said cabin, for receiving the spoken voice primarily in a first direction and for converting the spoken voice into a first audio signal, and a second microphone, positioned at a second location within said cabin, for receiving the spoken voice primarily in the first direction and for converting the spoken voice into a second audio signal;

a sound source that inputs sound into said cabin such that the input sound approaches said microphone array primarily in a second direction different from the first direction;

a processor for combining said first and second audio signals to provide a resultant audio signal, wherein the combining of said first and second audio signals defines a beampattern of said microphone array that includes a plurality of lobes and a plurality of nulls such that the spoken voice is primarily received by said microphone array along the first direction at a first one of said plurality of lobes and such that the input sound is primarily received by said microphone array along the second direction at a first one of said plurality of nulls, whereby any component in said resultant audio signal indicative of the input sound is substantially minimal; and a loudspeaker for converting said resultant audio signal into an output reproduced voice within said cabin.

9. The cabin of claim 8, wherein said first and second microphones define a beamformed phase array.

10. The cabin of claim 9, wherein the first one of said plurality of lobes is a main lobe of said beampattern.

11. The cabin of claim 9, wherein said sound source is said loudspeaker.

12. The cabin of claim 11, further comprising a second sound source that inputs a second sound into said cabin such that the input second sound approaches said microphone array primarily in a third direction different from both the first and second directions, wherein the input second sound is primarily received by said microphone array along the third direction at a second one of said plurality of nulls, whereby any component in said resultant audio signal indicative of the input second sound is substantially minimal.

13. The cabin of claim 12, wherein said second sound source is a loudspeaker of an entertainment system.

14. The cabin of claim 9, wherein said sound source is a loudspeaker of an entertainment system.

* * * * *